Figure 1:
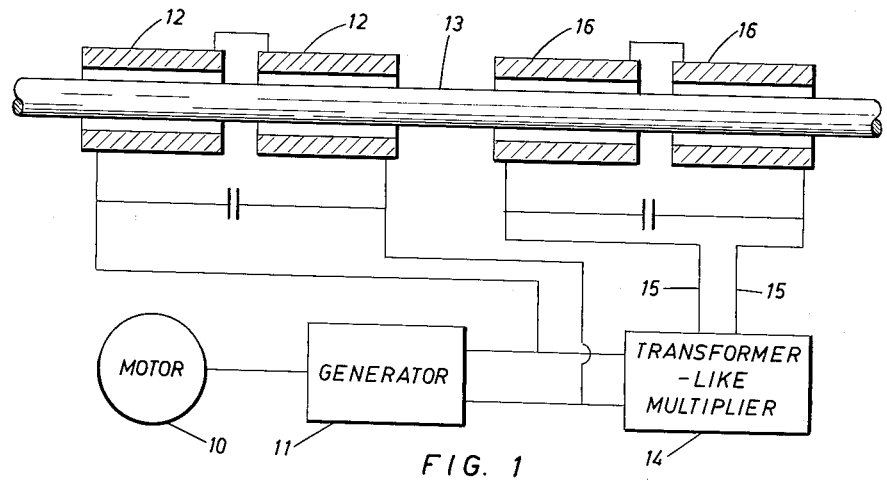

Oct. 9, 1962  P. P. BIRINGER  3,057,985
METHOD AND SYSTEM FOR DUAL FREQUENCY HEATING HAVING
A SINGLE FREQUENCY POWER SOURCE
Filed Jan. 20, 1959

Inventor
PAUL P. BIRINGER
by: *Cavanagh & Norman*

United States Patent Office 3,057,985
Patented Oct. 9, 1962

3,057,985
METHOD AND SYSTEM FOR DUAL FREQUENCY HEATING HAVING A SINGLE FREQUENCY POWER SOURCE
Paul P. Biringer, 92 Falcon St., Toronto, Ontario, Canada
Filed Jan. 20, 1959, Ser. No. 787,990
2 Claims. (Cl. 219—10.41)

This invention relates to a method and system for dual frequency induction heating utilizing a single frequency power source in which particular frequencies may be selected from a supplied range to achieve an efficient heating effect and temperature distribution in magnetic and non-magnetic materials subjected to heating by induced magnetic fields.

It is known that there is a particular frequency which may be the most economical from the point of view of power consumption for effecting the heating of a particular kind of material of predetermined dimensions. It is also known that as the induction heating process proceeds and the material being heated increases in temperature, the resistivity and permeability of the material being heated changes, thus causing a shift in that frequency value which might be considered to be the most economical for effective heating by induction. The recognition of this phenomenon has resulted in the use of dual or multiple frequency induction heating in which the heating process is initiated at a low supply main frequency and higher frequencies are employed to complete the heating process. Such prior dual frequency induction heating systems are energized in their higher frequency induction heating circuits by power supply sources. As an alternative, two or more generators may be utilized for separate co-axial heating systems operating at different frequencies and all driven by a common motor. Such multiple generator arrangements are relatively inefficient due to the fact that the load conditions thereon are subject to wide variation.

It is the main object of this invention to provide an induction heating system where at least two frequencies are utilized to achieve an optimum heating efficiency, the same being obtained by utilizing a motor generator set in combination with a static frequency multiplier for supplying a second heating frequency.

It is another object of the invention to provide a method and system as before in which the input power factor of the static frequency multiplier is corrected.

It is a still further object of the invention to provide a method and system as before in which the load circuit of the static frequency multiplier is compensated in its power factor by a controllable saturable reactance device, either manually or automatically.

With the foregoing and other objects in view, the invention generally concerns that method for inductively heating the subject material within a plurality of axially spaced induction heating coils which comprises energizing at least one of said coils with a portion of an electrical power source at predetermined frequency; energizing the remainder of said coils with a portion of said source power by statically multiplying said portion and isolating harmonics generated by said multiplication from said source.

The invention also generally relates to the system for induction heating wherein a number of frequencies are used to achieve optimum heating efficiency comprising an electrical source of induction heating energy of predetermined frequency; means energizable by said source for inductively heating the subject material at said frequency; means including a static frequency multiplying transformer for heating said subject material at a multiplied frequency; and means effecting energizing of said transformer by said source.

Other objects of the invention will be apparent from a study of the following specification taken in conjunction with the accompanying drawings.

Figure 2:
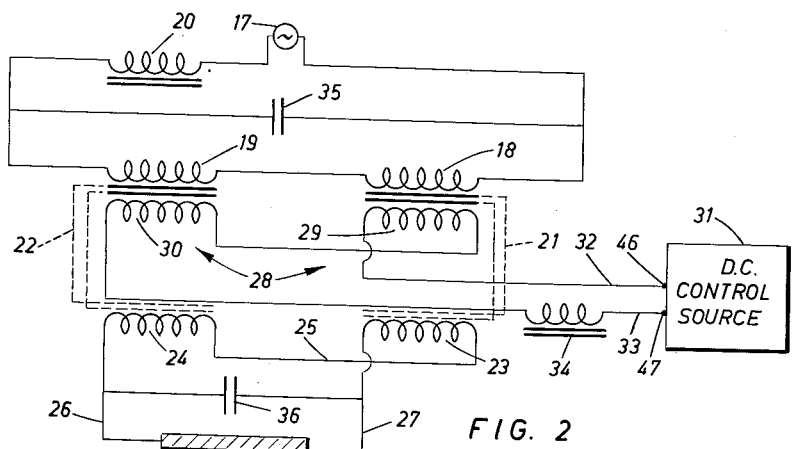
Figure 3:
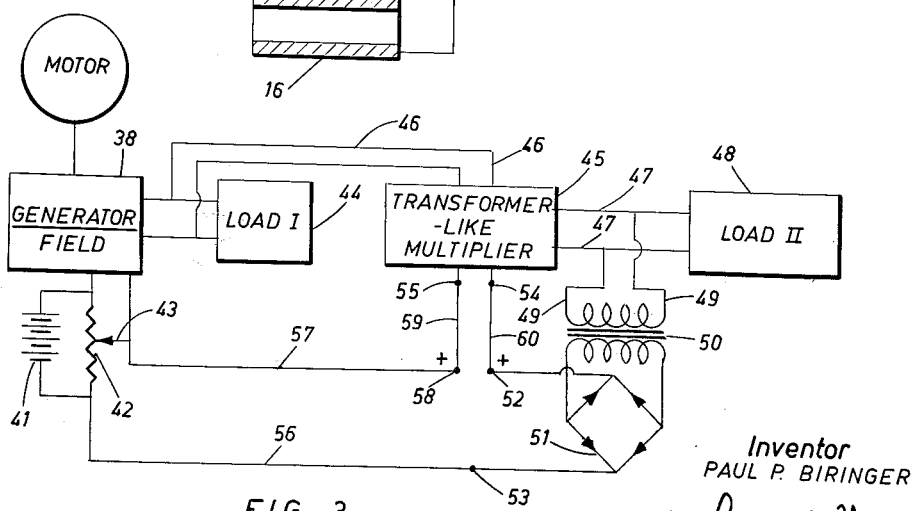

In the drawings:

FIGURE 1 is an electrical schematic of one elementary form of the method and system of the invention in which a subject material is heated by dual frequency heating process;

FIGURE 2 is an electrical schematic of one suitable form of static frequency doubler transformer device according to the invention and adapted to be energized by a single frequency power source; and FIGURE 3 is a block diagram electrical schematic of a fully developed method and system for induction heating according to the invention in which load shift compensation may be provided for during the heating operation.

In the drawings, the elementary form of the invention is illustrated in which the motor 10 drives the single frequency generator 11 which latter effects direct energization of induction heating coils 12 extending about a subject material or workpiece 13 co-axially aligned therein. The generator 11 acting as a single energizing source also energizes the transformer-like multiplier 14, which latter is designated herein as a static frequency multiplying transformer, such as of the form disclosed in my United States Patent No. 2,849,674, dated August 26, 1958, and assigned to the same assignee as this application. Multiplier 14 is connected by lines 15 to energize the higher frequency induction heating coils 16.

A transformer-like doubler of the invention is illustrated in schematic form in FIGURE 2 wherein the single frequency source 17 energizes the primary windings 18 and 19 in series with a linear reactor 20.

Cores 21 and 22 respectively carry the primary windings 18 and 19 and additionally carry the output or secondary windings 23 and 24 connected in series by line 25 for load output connection 26, 27 to the higher frequency induction heating coil 16. The static frequency doubling transformer device embodies a saturable reactor portion 28 comprising the reactor windings 29 and 30 wound in opposite sense on cores 21 and 22 and controllable by a direct current control source 31 through leads 32 and 33, one of which embodies the choke 34. By this means, the saturation of cores 21 and 22 may be controlled to thus control the magnetic coupling of the secondary windings thereby effecting control of output power energizing the induction heating coil 16.

The frequency doubling transformer of FIGURE 2 functions effectively as a harmonic generator in which the reflected harmonics are isolated from the source 17. The linear reactance 20 effects distortion of primary voltages to improve harmonic generation and the isolation of reflected harmonics by the L-C combination thereof with condenser 35 serves to correct the power factor across distorted voltages. Condenser 36 is selected for peaking of the selected higher frequency of output power.

In FIGURE 3, the method and system of the invention is illustrated in a developed form in which automatic voltage regulating is embodied in a fully compensated network of the general kind illustrated in FIGURES 1 and 2. The generator 38 driven by motor 39 embodies direct current field windings 40 which control the voltage output of the generator, depending upon their current excitation controlled by direct current source 41 and potentiometer 42 having a slider 43. Generator 38 directly energizes the load I also designated by numeral 44 and which may be in the form of a suitable induction heating coil adapted to operate at generator output power frequency. The transformer-like multiplier 45 is connected by lines 46 for energization by the generator 38 and delivers its multiplied frequency output by lines 47 to load II designated by numeral 48 and in the form of an induction heating coil or coils adapted to operate at the multiplied frequency. The invention contemplates the automatic distribution of power according to the demands of loads I and II and automatic voltage regulation. Thus, the output voltage of load II is communicated as a voltage signal by lines 49 through a suitable transformer 50 to rectifier 51, thence to terminals 52 and 53 whereby terminal 52 is positive as compared to terminal 53. If desired, terminals 52 and 53 may be connected directly to terminals 54 and 55 of the transformer-like multiplier 45, said terminals being connected in said multiplier for energization of the control saturating windings as for example, the control windings 29 and 30 of FIGURE 2. By this means, the voltage output of multiplier 45 will be regulated to a uniform voltage level. If desired, leads 56 and 57 may be connected from potentiometer 42 and slider 43 to terminals 58 and 53 respectively. Leads 59 and 60 may therefore be connected from terminals 58 and 52 to terminals 55 and 54 whereby the reference voltage for regulation of the output of the multiplier 45 is a function of the voltage remaining across variable resistor 42 beyond that power utilized for excitation of the field windings 40 of the generator 38. Accordingly, the potentiometer 42 and slider 43 thereof may be utilized as a voltage dividing network in which the unapportioned portion for field excitation from the voltage source 41 is utilized as a reference voltage to control the saturation and hence the output of the multiplier 45. By this means, the energization of load I as compared with the energization of load II may be varied within a wide range while at any one selected adjustment of this slider or apportioning control 42 the voltage is regulated to the level side.

It will be apparent that at any one second, the control or reference voltage from lines 56 and 57 is opposite in potential to that at terminals 52 and 53 and if of equal magnitude, effects zero direct current excitation of the control saturating windings of the multiplier. On the other hand, if the direct current signal at terminals 52 and 53 is greater or less than the control signal, the said signal, having regard to its sign, will effect a corresponding correction to multiplier output by corresponding saturation excitation. In FIGURE 3 only the general functional requisites have been indicated, it being understood that the signal voltage obtained from lines 49 may be amplified or otherwise processed in various known ways to achieve the function and method specified.

I claim:
1. The method of inductively heating a subject material within a plurality of axially spaced induction heating coils, comprising: energizing one of said coils with a portion of an electrical power source at predetermined frequency; energizing the remainder of said coils with the remainder of said power source by statically multiplying said remainder; during statically multiplying said remainder of said power source, regulating the multiplying thereof; establishing an electrical controlled source of predetermined voltage; dividing said control voltage source to provide selectable voltage therefrom; controlling the electrical power output of said electrical power source responsive to said selectable voltage; and utilizing the remainder of said predetermined control voltage as a reference voltage controlling the level of regulation of the multiplying of the remainder of said power source.

2. In an induction heating system having a plurality of induction heating coils adapted to operate at different induction heating frequencies, the combination therewith of: a single source of energizing electrical power of predetermined frequency; means connecting said source to at least one of said induction heating coils for energization of the latter and utilization of at least a portion of the power from said source; a transformer-like multiplier energized by said source for multiplying the frequency of the remainder of the power thereof; means communicating said remaining power of said multiplied frequency to the other of said induction heating coils, said multiplier embodying control saturation windings; means for energizing said control saturating windings thereby to regulate the output of said multiplier; means controlling said energizing means responsive to the output of said multiplier to effect regulation thereof; a direct current electrical source of predetermined potential; a voltage dividing network for distributing said potential responsive to manual adjustment; means controlling the voltage output of said single source and connected to said network thereby rendering the output of said source manually controllable; and means effecting saturation of opposed sign in said controlling windings of said multiplier responsive to the undistributed control potential of said network.

References Cited in the file of this patent
UNITED STATES PATENTS

| | | |
|---|---|---|
| 1,646,498 | Seede | Oct. 25, 1927 |
| 2,381,323 | Vore | Aug. 7, 1945 |
| 2,444,259 | Jordan | June 29, 1948 |
| 2,669,647 | Segsworth | Feb. 16, 1954 |
| 2,815,425 | Deffenbaugh | Dec. 3, 1957 |
| 2,849,674 | Biringer | Aug. 26, 1958 |